United States Patent
Kwon et al.

(10) Patent No.: US 11,553,364 B2
(45) Date of Patent: Jan. 10, 2023

(54) SYSTEM AND METHOD FOR REPORTING BEAM INFORMATION

(71) Applicant: Futurewei Technologies, Inc., Plano, TX (US)

(72) Inventors: Young Hoon Kwon, Laguna Niguel, CA (US); Pengfei Xia, San Diego, CA (US); Bin Liu, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 16/988,394

(22) Filed: Aug. 7, 2020

(65) Prior Publication Data

US 2021/0029570 A1 Jan. 28, 2021

Related U.S. Application Data

(63) Continuation of application No. 16/001,652, filed on Jun. 6, 2018, now Pat. No. 10,743,204.

(60) Provisional application No. 62/584,368, filed on Nov. 10, 2017.

(51) Int. Cl.
*H04W 24/10* (2009.01)
*H04W 16/28* (2009.01)
*H04W 84/04* (2009.01)

(52) U.S. Cl.
CPC ........... *H04W 24/10* (2013.01); *H04W 16/28* (2013.01); *H04W 84/042* (2013.01)

(58) Field of Classification Search
None
See application file for complete search history.

(56) References Cited

U.S. PATENT DOCUMENTS

| 10,257,836 B1* | 4/2019 | Wang ..................... H04L 5/0025 |
| 11,139,881 B2* | 10/2021 | Harada ................. H04W 76/19 |
| 2017/0086195 A1 | 3/2017 | Yum et al. |
| 2018/0084446 A1* | 3/2018 | Li ........................ H04B 17/309 |
| 2019/0174346 A1 | 6/2019 | Murray et al. |
| 2020/0389220 A1* | 12/2020 | Kang ................ H04W 74/0833 |

FOREIGN PATENT DOCUMENTS

| CN | 104734805 A | 6/2015 |
| CN | 105556869 A | 5/2016 |
| CN | 109792283 A | 5/2019 |
| TW | 201735560 A | 10/2017 |
| WO | 2017067138 A1 | 4/2017 |
| WO | 2017107084 A1 | 6/2017 |
| WO | 2017164933 A1 | 9/2017 |

OTHER PUBLICATIONS

"RAN1 Chairman's Notes," 3GPP TSG RAN WG1 Meeting 90bis, Prague, CZ, Oct. 9-13, 2017, 162 pages.

* cited by examiner

*Primary Examiner* — Anh Ngoc M Nguyen
(74) *Attorney, Agent, or Firm* — Slater Matsil, LLP

(57) ABSTRACT

A method for reporting beam information includes setting, by a user equipment (UE), a report type of a beam information report, wherein the beam information report includes beam indices of communications beams being reported, a reference beam quality measurement of one of the communications beams reported, and a report type field conveying the report type, and sending, by the UE to an access node, the beam information report.

20 Claims, 8 Drawing Sheets

| 705 | 710 | 715 | 720 | 725 | 730 |
|---|---|---|---|---|---|
| BI_0 = 5 | R-RSRP = 49* | BI_1 = 3 | D-RSRP_1 = J** | BI_2 = 2 | D-RSRP_2 = 15 |

\* 49 CORRESPONDS TO [-91, 90)
\*\* JX <= 10 & (J+1)X > 10

| 805 | 810 | 815 | 820 |
|---|---|---|---|
| BI_0 = 5 | R-RSRP = 49* | BI_1 = DC | D-RSRP_1 = 15 |

\* 49 CORRESPONDS TO [-91, 90)

| 855 | 860 | 865 | 870 |
|---|---|---|---|
| BI_0 = 5 | R-RSRP = 49* | BI_1 = 5 | D-RSRP_1 = 15 |

\* 49 CORRESPONDS TO [-91, 90)

| 905 | 910 | 915 | 920 | 925 | 930 |
|---|---|---|---|---|---|
| BI_0 = 5 | R-RSRP = 49* | BI_1 = 3 | D-RSRP_1 = J** | BI_2 = 3 | D-RSRP_2 = J |

\* 49 CORRESPONDS TO [-91, 90)
\*\* JX <= 10 & (J+1)X > 10

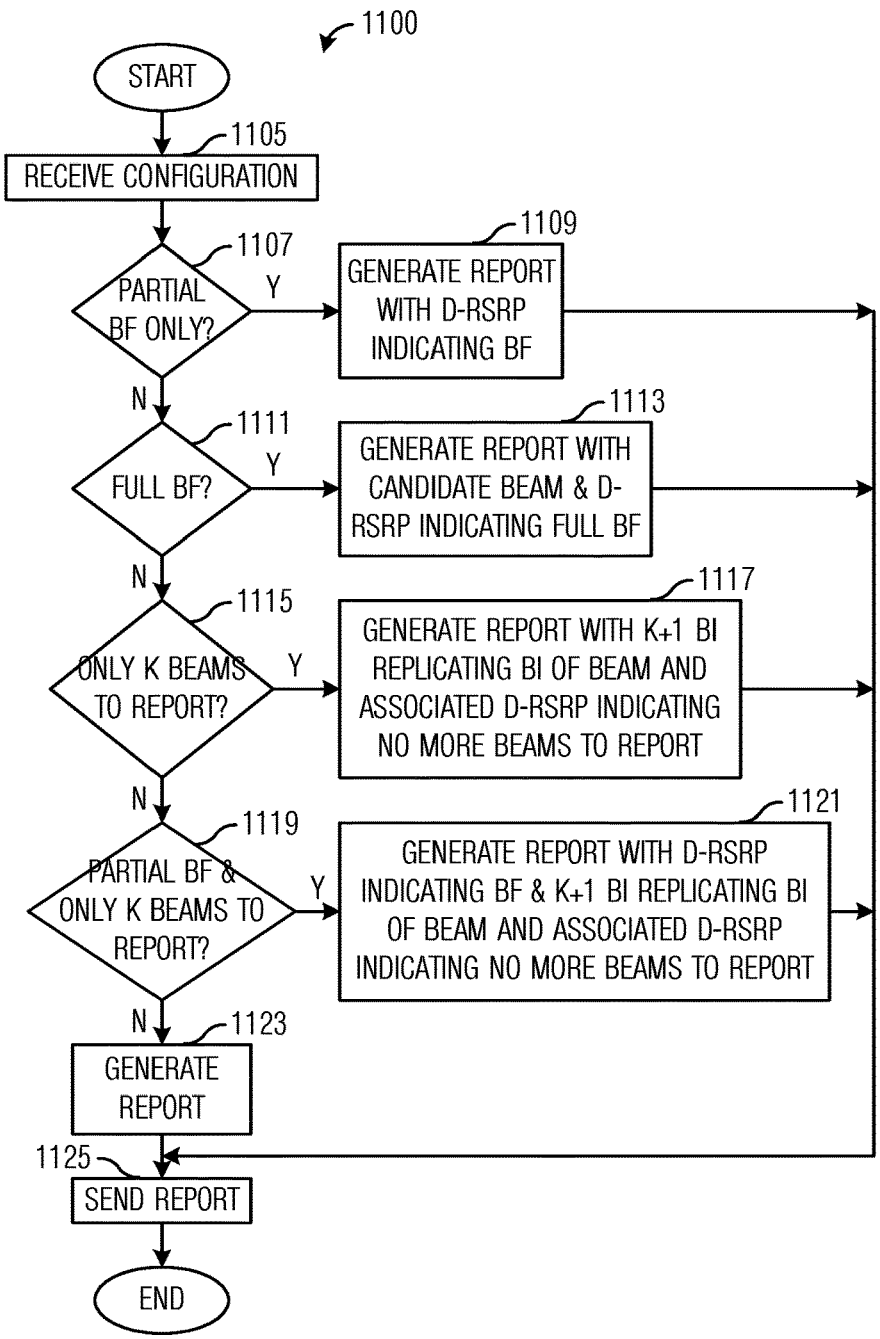

SYSTEM AND METHOD FOR REPORTING BEAM INFORMATION

This application is a continuation of U.S. application Ser. No. 16/001,652, filed on Jun. 6, 2018, entitled "System and Method for Reporting Beam Information," which claims the benefit of U.S. Provisional Application No. 62/584,368, filed on Nov. 10, 2017, entitled "System and Method for Reporting Beam Information," which application is hereby incorporated herein by reference in its entirety.

TECHNICAL FIELD

The present disclosure relates generally to a system and method for digital communications, and, in particular embodiments, to a system and method for reporting beam information.

BACKGROUND

One possible deployment scenario for fifth generation (5G) New Radio (NR) system architecture uses high frequency (HF) (6 gigahertz (GHz) and above, such as millimeter wavelength (mmWave)) operating frequencies to exploit greater available bandwidth and less interference then what is available at the congested lower frequencies. However, pathloss is a significant issue. Beamforming may be used to overcome the high pathloss. Beamforming uses directional beams in transmission or receiving to increase signal gain, and therefore, compensate for pathloss.

Beam information, such as beam quality information (e.g., reference signal received power (RSRP), reference signal received quality (RSRQ), received signal strength, signal to noise ratio (SNR), signal plus interference to noise ratio (SINR), and so on), beam failure information, and so forth, is useful in beamformed communications. As an example, beam quality information may be used in beam selection or beam refinement, while beam failure information may be used in beam failure detection or recovery.

Therefore, there is a need for systems and methods for reporting beam information.

SUMMARY

Example embodiments provide a system and method for reporting beam information.

In accordance with an example embodiment, a computer implemented method for reporting beam information is provided. The method includes setting, by a user equipment (UE), a report type of a beam information report, wherein the beam information report includes beam indices of communications beams being reported, a reference beam quality measurement of one of the communications beams reported, and a report type field conveying the report type, and sending, by the UE to an access node, the beam information report.

Optionally, in any of the preceding embodiments, an embodiment wherein the report type field conveys that the beam information report message is a partial beam failure report message, wherein the reference beam quality measurement corresponds to one communications beam out of regular communications beams with a best beam quality measurement, and wherein the partial beam failure report message includes first beam indices of the regular communications beams, and second beam indices of failed communications beams.

Optionally, in any of the preceding embodiments, an embodiment wherein the partial beam failure report message further includes first beam quality measurements associated with the regular communications beams.

Optionally, in any of the preceding embodiments, an embodiment wherein the first beam quality measurements are relative to the reference beam quality measurement.

Optionally, in any of the preceding embodiments, an embodiment wherein each of the first beam quality measurements are relative to one beam quality measurement out of the reference beam quality measurement or one beam quality measurement out of the first beam quality measurements.

Optionally, in any of the preceding embodiments, an embodiment wherein the partial beam failure report message further includes additional beam quality measurements associated with the regular communications beams excluding the one communications beam out of the regular communications beams with the best beam quality measurement.

Optionally, in any of the preceding embodiments, an embodiment wherein the report type field conveys that the beam information report message is a total beam failure report message, wherein the reference beam quality measurement corresponds to a candidate communications beam, and wherein the total beam failure report message includes a beam index of a candidate communications beam.

Optionally, in any of the preceding embodiments, an embodiment wherein the report type field conveys that the beam information report message is a partial beam report message, wherein the reference beam quality measurement corresponds to one communications beam out of regular communications beams with a best beam quality measurement, and wherein the partial beam report message further includes additional beam quality measurements associated with the regular communications beams excluding the one communications beam out of the regular communications beams with the best beam quality measurement.

Optionally, in any of the preceding embodiments, an embodiment wherein the partial beams report message further includes additional beam quality measurements associated with the regular communications beams excluding the one communications beam out of the regular communications beams with the best beam quality measurement.

Optionally, in any of the preceding embodiments, an embodiment wherein the report type field conveys that the beam information report message is a partial beam failure with partial beam report message, wherein the reference beam quality measurement corresponds to one communications beam out of regular communications beams with a best beam quality measurement, and wherein the partial beam failure with partial beam report message includes first beam indices of the regular communications beams excluding the one communications beam out of the regular communications beams with the best beam quality measurement, and second beam indices of failed communications beams.

In accordance with an example embodiment, a UE is provided. The UE includes a memory storage comprising instructions, and one or more processors in communication with the memory storage. The one or more processors execute the instructions to set a report type of a beam information report, wherein the beam information report includes beam indices of communications beams being reported, a reference beam quality measurement of one of the communications beams reported, and a report type field conveying the report type, and send, to an access node, the beam information report.

Optionally, in any of the preceding embodiments, an embodiment wherein the report type field conveys that the beam information report message is a partial beam failure report message, wherein the reference beam quality measurement corresponds to one communications beam out of regular communications beams with a best beam quality measurement, and wherein the partial beam failure report message includes first beam indices of the regular communications beams, and second beam indices of failed communications beams.

Optionally, in any of the preceding embodiments, an embodiment wherein the partial beam failure report message further includes first beam quality measurements associated with the regular communications beams.

Optionally, in any of the preceding embodiments, an embodiment wherein the partial beam failure report message further includes additional beam quality measurements associated with the regular communications beams excluding the one communications beam out of the regular communications beams with the best beam quality measurement.

Optionally, in any of the preceding embodiments, an embodiment wherein the report type field conveys that the beam information report message is a total beam failure report message, wherein the reference beam quality measurement corresponds to a candidate communications beam, and wherein the total beam failure report message includes a beam index of a candidate communications beam.

Optionally, in any of the preceding embodiments, an embodiment wherein the report type field conveys that the beam information report message is a partial beam report message, wherein the reference beam quality measurement corresponds to one communications beam out of regular communications beams with a best beam quality measurement, and wherein the partial beam report message further includes additional beam quality measurements associated with the regular communications beams excluding the one communications beam out of the regular communications beams with the best beam quality measurement.

Optionally, in any of the preceding embodiments, an embodiment wherein the partial beams report message further includes additional beam quality measurements associated with the regular communications beams excluding the one communications beam out of the regular communications beams with the best beam quality measurement.

Optionally, in any of the preceding embodiments, an embodiment wherein the report type field conveys that the beam information report message is a partial beam failure with partial beam report message, wherein the reference beam quality measurement corresponds to one communications beam out of regular communications beams with a best beam quality measurement, and wherein the partial beam failure with partial beam report message includes first beam indices of the regular communications beams excluding the one communications beam out of the regular communications beams with the best beam quality measurement, and second beam indices of failed communications beams.

In accordance with an example embodiment, a non-transitory computer-readable media storing computer instructions is provided. When executed by one or more processors, the computer instructions cause the one or more processors to perform the steps of set a report type of a beam information report, wherein the beam information report includes beam indices of communications beams being reported, a reference beam quality measurement of one of the communications beams reported, and a report type field conveying the report type, and send the beam information report.

Optionally, in any of the preceding embodiments, an embodiment wherein the report type field conveys that the beam information report message is a partial beam failure report message, wherein the reference beam quality measurement corresponds to one communications beam out of regular communications beams with a best beam quality measurement, and wherein the partial beam failure report message includes first beam indices of the regular communications beams, and second beam indices of failed communications beams.

Optionally, in any of the preceding embodiments, an embodiment wherein the report type field conveys that the beam information report message is a total beam failure report message, wherein the reference beam quality measurement corresponds to a candidate communications beam, and wherein the total beam failure report message includes a beam index of a candidate communications beam.

Optionally, in any of the preceding embodiments, an embodiment wherein the report type field conveys that the beam information report message is a partial beam report message, wherein the reference beam quality measurement corresponds to one communications beam out of regular communications beams with a best beam quality measurement, and wherein the partial beam report message further includes additional beam quality measurements associated with the regular communications beams excluding the one communications beam out of the regular communications beams with the best beam quality measurement.

Optionally, in any of the preceding embodiments, an embodiment wherein the report type field conveys that the beam information report message is a partial beam failure with partial beam report message, wherein the reference beam quality measurement corresponds to one communications beam out of regular communications beams with a best beam quality measurement, and wherein the partial beam failure with partial beam report message includes first beam indices of the regular communications beams excluding the one communications beam out of the regular communications beams with the best beam quality measurement, and second beam indices of failed communications beams.

Practice of the foregoing embodiments enables a single uplink control information (UCI) format to be used to report multiple different types of beam information. In addition, the use of a single UCI format to report beam information helps to reduce signaling overhead associated with reporting different types of beam information. Reducing the signaling overhead helps to improve overall communications overhead.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 7 illustrates an example format of a beam information report reporting partial beam failure according to example embodiments described herein;

FIG. 8A illustrates a first example format of a beam information report reporting full beam failure according to example embodiments described herein;

FIG. 8B illustrates a second example format of a beam information report reporting full beam failure according to example embodiments described herein;

FIG. 9 illustrates an example format of a beam information report reporting fewer beams than configured according to example embodiments described herein;

FIG. 10 illustrates an example format of a beam information report reporting partial beam failure and fewer beams than configured according to example embodiments described herein;

FIG. 11 illustrates a flow diagram of example operations occurring in a UE generating and sending a beam information report according to example embodiments described herein;

DETAILED DESCRIPTION OF ILLUSTRATIVE EMBODIMENTS

The making and using of the disclosed embodiments are discussed in detail below. It should be appreciated, however, that the present disclosure provides many applicable inventive concepts that can be embodied in a wide variety of specific contexts. The specific embodiments discussed are merely illustrative of specific ways to make and use the embodiments, and do not limit the scope of the disclosure.

Figure 1:
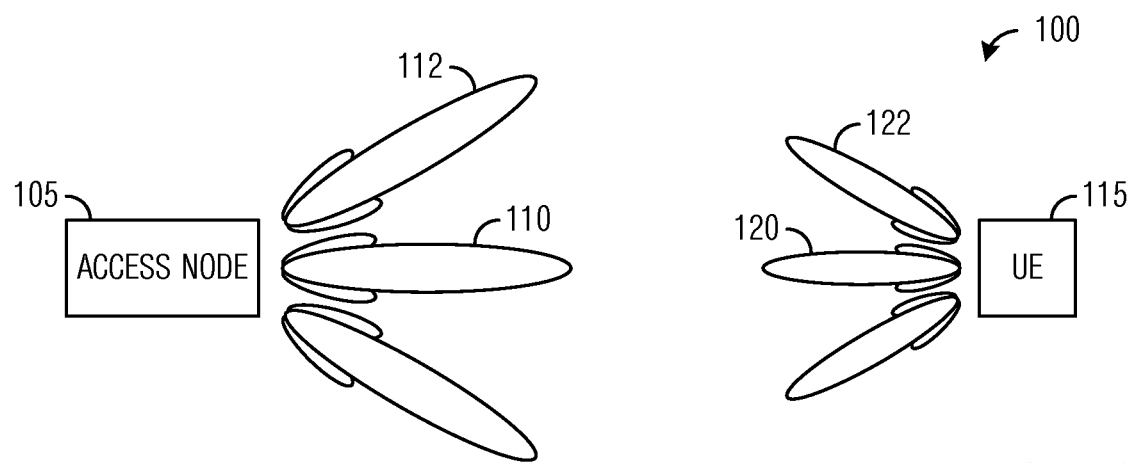
FIG. 1 illustrates an example wireless communications system according to example embodiments described herein.

FIG. 1 illustrates an example wireless communications system 100. Communications system 100 includes an access node 105 serving a user equipment (UE) 115. In a first operating mode, communications to and from UE 115 pass through access node 105. In a second operating mode, communications to and from UE 115 do not pass through access node 105, however, access node 105 typically allocates resources used by UE 115 to communicate. Access nodes may also be commonly referred to as evolved NodeBs (eNBs), base stations, NodeBs, master eNBs (MeNBs), secondary eNBs (SeNBs), next generation (NG) NodeBs (gNBs), master gNBs (MgNBs), secondary gNBs (SgNBs), remote radio heads, access points, and the like, while UEs may also be commonly referred to as mobiles, mobile stations, terminals, subscribers, users, stations, and the like. A transmission point (TP) may be used to refer to any network entity capable of transmitting. Similarly, transmission-reception points (TRP) is a network entity that is capable of both transmitting and receiving, and commonly refer to access nodes, eNBs, gNBs, base stations, NodeBs, MeNBs, SeNBs, MgNBs, SgNBs, remote radio heads (RRHs), access points. In some situations, UEs (and similar devices) may also be operating as TRPs.

While it is understood that communications systems may employ multiple access nodes capable of communicating with a number of UEs, only one access node and one UE are illustrated for simplicity.

As discussed previously, pathloss in communications systems operating at high frequency (HF) (6 gigahertz (GHz) and above, such as millimeter wavelength (mm-Wave)) operating frequencies is high, and beamforming may be used to overcome the high pathloss. As shown in FIG. 1, both access node 105 and UE 115 communicate using beamformed transmissions and receptions. As an example access node 105 communicates using a plurality of communications beams, including beams 110 and 112, while UE 115 communicates using a plurality of communications beams, including beams 120 and 122.

A beam may be a pre-defined set of beamforming weights in the context of codebook-based precoding or a dynamically defined set of beamforming weights in the context of non-codebook based precoding (e.g., Eigen-based beamforming (EBB)). A beam may also be a pre-defined set of phase shift preprocessors combining signals from the antenna array in the radio frequency (RF) domain. It should be appreciated that a UE may rely on codebook-based precoding to transmit uplink signals and receive downlink signals, while a TRP may rely on non-codebook based precoding to form certain radiation patterns to transmit downlink signals or receive uplink signals.

Figure 2:
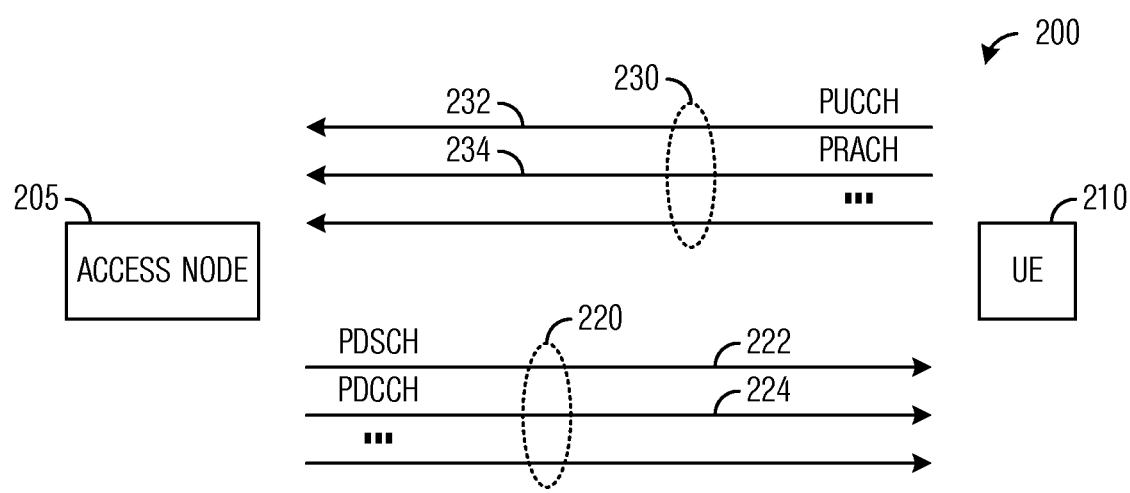
FIG. 2 illustrates a communications system highlighting an example channel structure between an access node and a UE according to example embodiments described herein.

FIG. 2 illustrates a communications system 200 highlighting an example channel structure between an access node 205 and a UE 210. In a bi-directional communications implementation, there is a downlink channel 220 and an uplink channel 230 between access node 205 and UE 210. Downlink channel 220 and uplink channel 230 may each include a plurality of unidirectional channels. As shown in FIG. 2, downlink channel 220 includes a physical downlink shared channel (PDSCH) 222 and a physical downlink control channel (PDCCH) 224 among others, while uplink channel 230 includes a physical uplink control channel (PUCCH) 232 and a physical random access channel (PRACH) 234 among others.

At the Third Generation Partnership Project (3GPP) RAN1 #90b meeting, mechanisms for beam measurement and reporting were discussed. Some agreements were made, including:

How synchronization signal block (SSB) resources within a resource setting for beam management are configured.

Layer 1 (L1) RSRP measurement on the configured resources are reported.

For non-grouping based beam reporting by the UE, support for the following report parameters is provided
The maximum number of configured transmit (Tx) beams for beam measurement is K, where K=64.
The maximum number of configured Tx beams to be reported in one instance is N_max, where N_max=2 or 4, where a subset of N beams (with N<=N_max, e.g., N=1, 2, 3, 4) may be selected by the access node and signaled to the UE.

Differential L1-RSRP values are used when multiple beams are reported in a single reporting instance. As an example, the differential L1-RSRP are in reference to a largest L1-RSRP reported in the reporting instance. Other potential references for differential L1-RSRP are possible.

The L1-RSRP is to be reported in a 7-bit wide field with values ranging from −140 dBm to −44 dBm with a 1 dB step size, and the differential L1-RSRP is to be reported in a 4-bit wide field, with the step size of the differential L1-RSRP for further study.

Also at the 3GPP RAN1 #90b meeting, mechanisms for beam failure reporting using a PUCCH were discussed. Some agreements were made, including:

5G NR supports reusing existing periodic PUCCH-based beam reports for reporting beam pair link failures.

In a first case (Case 1): when a subset of PDCCH beams fails, the failed PDCCH beam index information or newly identified beam information and their associated L1-RSRP(s) are reported.

In a second case (Case 2): when beam failure is detected, one newly identified beam index (e.g., SSB index or CSI-RS resource identifier) and its associated L1-RSRP are reported.

The UE reports which case is reported in one reporting instance.

It is noted that normal beam reporting using the periodic PUCCH channel is agreed on (3GPP RAN1 #90b meeting). It is also noted that no new UCI formation should be introduced. It is further noted that the UE may be semi-statically configured to use one or both PUCCH resource and non-contention PRACH resources for beam failure recovery request (BFRQ) transmission. It may be up to the UE implementation regarding how to choose between the two resources (PUCCH or PRACH) if both resources are configured.

Figure 3:
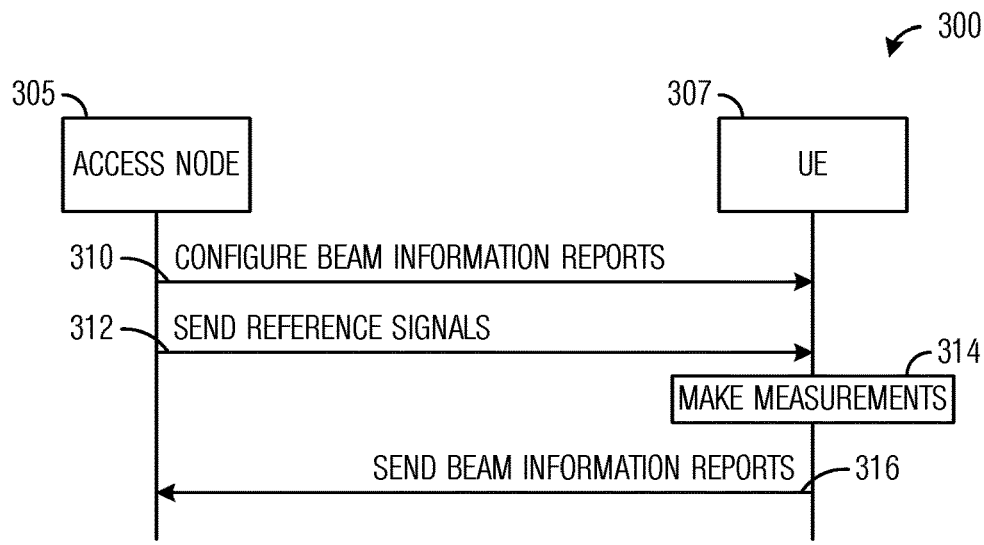
FIG. 3 illustrates a diagram displaying communications made by and processing performed by devices participating in reporting beam information according to example embodiments described herein.

FIG. 3 illustrates a diagram 300 displaying communications made by and processing performed by devices participating in reporting beam information. Diagram 300 displays communications made by and processing performed by an access node 305 and a UE 307 participating in reporting beam information of beams between access node 305 and UE 307.

Access node 305 configures beam information reports for UE 307 (event 310). Access node 305 sends reference signals in configured resources (event 312). The reference signals assist UE 307 in making measurements (block 314). UE 307 sends beam information reports (event 316).

There may be more than one situation where a UE reports beam information using the PUCCH, where the beam information may include:
Beam measurement information reporting for all assigned beams.
Beam measurement information reporting for a subset of all assigned beams.
Partial beam failure report.
Full beam failure report.

However, the format of a frame carrying the beam information is different for different situations, there are simply too many different types of UCI formats needed. Too many different UCI formats will generally increase the parsing complexity at an access node and has additional signaling overhead associated with a need to convey a greater number of different UCI formats.

Figure 4:
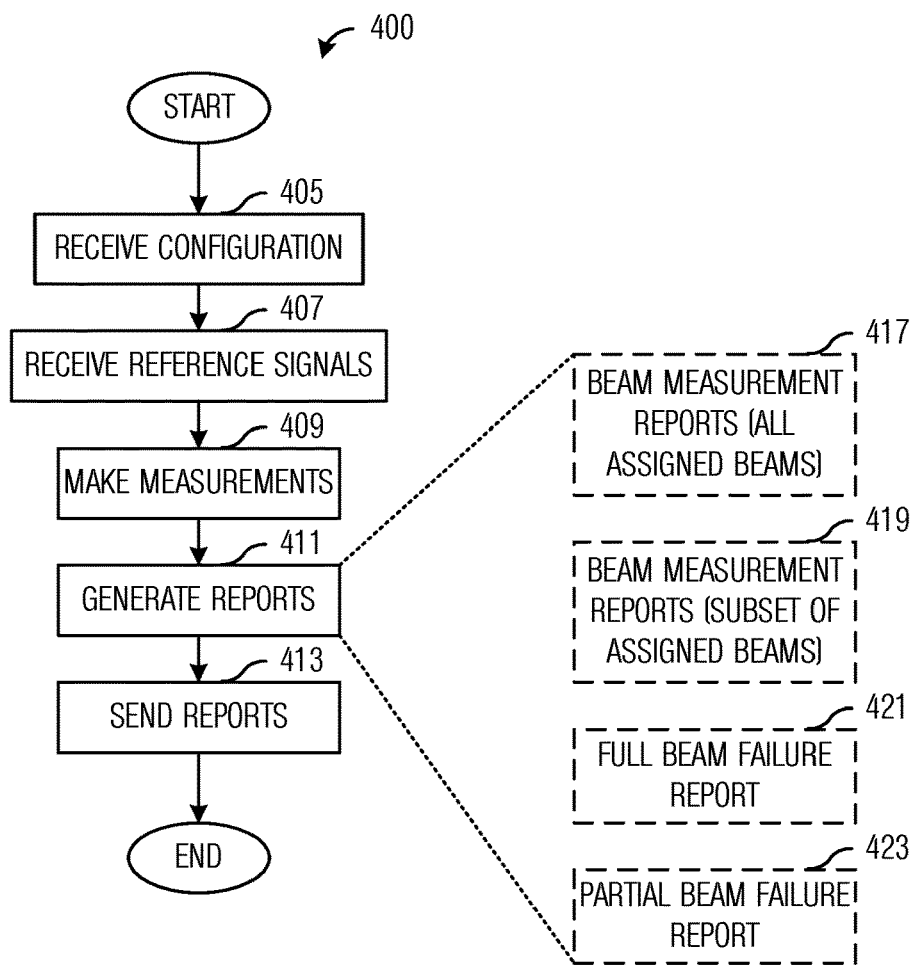
FIG. 4 illustrates a flow diagram of example operations occurring in a UE reporting beam information according to example embodiments described herein.

FIG. 4 illustrates a flow diagram of example operations 400 occurring in a UE reporting beam information. Operations 400 may be indicative of operations occurring in a UE as the UE reports beam information.

Operations 400 begin with the UE receiving beam information reporting configuration from an access node (block 405). The UE receives reference signals sent by the access node (block 407) and makes measurements of a channel(s) between the access node and the UE in accordance with the received reference signals (block 409). The UE generates beam information reports (block 411) and sends the beam information reports (block 413). The beam information reports may be sent in frames, messages, or a combination thereof. The beam information reports and how they are sent may be in accordance with the beam information report configuration received from the access node.

The beam information reports generated by the UE may include one or more of the following: beam quality information reports for all assigned beams (block 417), beam measurement reports for a subset of all assigned beams (block 419), full beam failure report (block 421), or partial beam failure report (block 423).

Figures 5, 6A, 6B:
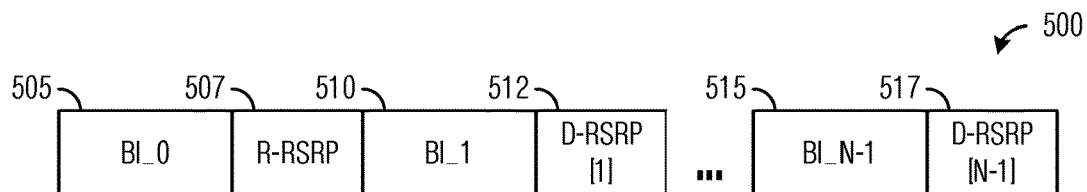
FIG. 5 illustrates an example beam information report frame used to report beam quality information according to example embodiments described herein.
FIG. 6A illustrates a table with example measured RSRP values and indices corresponding to different measured RSRP values according to example embodiments described herein.
FIG. 6B illustrates a table with example differential RSRP values and indices corresponding to different D-RSRP values according to example embodiments described herein.

FIG. 5 illustrates an example format of a beam information report 500 used to report beam quality information. Beam information reports may be transmitted and received in beam information report frames. The beam information reports may also be sent in beam information report messages. Therefore, the discussion of frames or messages should not be construed as being limiting to either the scope or spirit of the example embodiments. A beam information report, in the situation where there are N beams assigned for beam report, where N>1, includes at least:

N beam index (BI) fields, the size of the BI fields may be dependent upon the number of possible beams to be reported, for example, if there are 16 total beams, then the BI fields may each be 4-bits in size, although other values are possible, and N beam quality fields,
One reference RSRP (R-RSRP) field, which is 7-bits in size, for example, corresponding to the beam with the best RSRP, for example, although other values are possible, and
N−1 differential RSRP (D-RSRP) fields, which are 4-bits in size each, for example, although other values are possible.

It is noted that although the discussion focusses on the beam quality fields conveying RSRP values, the example embodiments presented herein may be used to convey other types of beam quality information, such as signal to noise ratio (SNR), signal plus interference to noise ratio (SINR), reference signal received quality (RSRQ), received signal strength indicator (RSSI), and so on. Therefore the discussion of RSRP should not be construed as being limiting to either the scope or the spirit of the example embodiments.

Beam information report 500, as shown in FIG. 5, comprises a first beam index (BI_0) field 505 containing a beam index of a beam with a best (e.g., greatest) RSRP and a R-RSRP field 507 that contains a beam quality information value. Beam information report 500 also comprises a second beam index (BI_1) field 510 containing a beam index of a first beam with a RSRP that is not the best RSRP and a D-RSRP field 512 that contains a beam quality information value of the first beam referenced to the beam quality information value contained in R-RSRP field 507. Beam information report 500 comprises up to N−2 additional beam index fields, such as a third beam index (BI_N−1) field 515 that contains a beam index of a N−1-th beam with a RSRP that is not the best RSRP and a D-RSRP field 517 that contains a beam quality information value of the N−1-th beam referenced to the beam quality information value contained in R-RSRP field 507.

It is noted that beam information report 500 is shown with alternating beam index values and beam quality information values, e.g., RSRP (R-RSRP or D-RSRP) values. However, other beam index value and beam quality information value arrangements are possible. As an example, the beam index values are presented first, followed by beam quality information values; or the beam quality information values are presented first, followed by beam index values. Furthermore, the beam quality information values for the first beam to the N−1-th beam may be arranged in descending or ascending RSRP value or they may be arranged in descending or ascending beam index value. Beam information report 500 is shown for illustrative purposes only and is not intended to be limiting to either the scope or the spirit of the example embodiments.

It is noted that if there is more than one beam assigned for a beam information report and if information conveying a specific beam information report type is needed, then a beam quality field (such as a R-RSRP field or a D-RSRP field) may be used to convey the specific beam information report type. However, because the size of the beam quality field is not small, the use of the beam quality field to convey the specific beam information report type may be a waste of resources. Therefore, it is desired to convey specific beam information report type using a beam quality field, but it is also desired to minimize the overhead associated with the conveyance of the information.

According to an example embodiment, a field in a beam information report is used to convey a beam information report type of the beam information report. A field of a third field type conveys the beam information report type of the beam information report, as described below. When a beam information report is set to report beam information for more than one beam, the beam information report comprises at least three information fields:

A first field type representing beam index, where there are more than one field of the first field type, A second field type representing a reference beam quality, where there is only one field of the second field type per beam information report, and A third field type representing a differential beam quality referenced to (relative to) the reference beam quality or another beam quality, where there are one or more field of the third field type, and where the third field type is also used to convey different beam information report types. As an example, a first third field includes a differential beam quality value relative to the reference beam quality, while a second third field includes a differential beam quality value relative to another third field (such as the first third field).

As another example, when a beam information report is set to report beam information for more than one beam, the beam information report comprises more than one beam quality fields, with At least two different bit-widths for beam quality fields, where a first bit-width for a first beam quality field type is larger than a second bit width for a second beam quality field type, and The second bit-width for the second beam quality field type is used to convey different beam information report types.

The following assumptions are made to simplify the discussion of the example embodiments, however, other values are supported:

The number of beams assigned for a beam information report is N, where N>1.

The beam information report comprises at least N fields representing beam indices (i.e., BI fields).

The beam information report comprises at least one field representing a reference beam quality (i.e., a R-RSRP field).

The beam information report comprises at least N−1 fields representing differential beam quality (i.e., D-RSRP fields).

Similarly, the assumptions may be expressed in terms of bit-width:

If a number of beams assigned for a beam information report is N, where N>1.

The beam report comprises at least N fields representing beam indices (i.e., BI fields).

The beam report comprises at least N fields representing beam quality, where there are two different bit-widths for the beam quality fields, There is at least one beam quality field with a first bit-width (i.e., the R-RSRP field), and There is at most N−1 beam quality fields with a second bit-width (i.e., the D-RSRP fields), where the first bit-width is greater than the second bit-width.

According to an example embodiment, in a partial beam failure situation with K regular beams and M failed beams, where 1<=K<N, 1<=M<N, and K+M=N, a differential beam quality field, such as a D-RSRP field, set to a specified value conveys a single failed beam. In an embodiment, each BI field represents a beam index of regular beams (beams that are not failed) or failed beams. In an embodiment, a reference beam quality field, such as a R-RSRP field, represents a beam quality of at least one regular beam, and K−1 differential beam quality fields, e.g., D-RSRP fields, representing a differential beam quality of the K−1 remaining regular beams. In an embodiment, M differential quality fields, e.g., D-RSRP fields, represent the M failed beams by conveying a predetermined value.

It is noted that there may only be one reference beam quality field in the beam information report, which represents a beam quality of a regular beam with a best RSRP value, for example. It is noted that the predetermined value to convey beam failure may be set to the highest value that the differential beam quality field is capable of representing. As an example, if the differential beam quality field is 4-bits long, then the predetermined value is 15 ($2^4-1$). It is noted that the predetermined value may be set to the smallest value that the differential beam quality field is capable of representing. Other values can be used to indicate beam failure.

The values stored in the reference beam quality field may be an index to a table of possible measured beam quality values, such as RSRP values. FIG. 6A illustrates a table 600 with example measured RSRP values and indices corresponding to different measured RSRP values. A first column 605 represents R-RSRP value indices, a second column 610 represents measured RSRP values corresponding to a particular R-RSRP value index, and a third column 615 represents the unit of the measured RSRP values, dBm, for example. As an example, a first value 620 represents index 0 and corresponds to a measured RSRP value of less than −140 dBm, a second value 622 represents index 1 and corresponds to a measured RSRP value of between −140 dBm and −139 dBm. Similarly, a third value 624 represents index 96 and corresponds to a measured RSRP value of between −45 dBm and −44 dBm. It is noted that the indices and measured RSRP values shown in table 600 are for illustrative purposes only and are not intended to be limiting to either the scope or the spirit of the example embodiments.

The values stored in the differential beam quality fields may also be indices to a table of possible differential beam quality values, such as differential RSRP values, referenced to a reference beam quality value, such as a R-RSRP value. FIG. 6B illustrates a table 650 with example differential RSRP values and indices corresponding to different D-RSRP values. A first column 655 represents D-RSRP value indices, a second column 660 represents D-RSRP values corresponding to a particular D-RSRP value index, and a third column 665 represents the unit of the D-RSRP values, dB, for example. As an example, a first value 670 represents index 0 and corresponds to a D-RSRP value (e.g., R-RSRP—measured RSRP value) that is less than X, which is the step size of the D-RSRP values, a second value 672 represents index 1 and corresponds to a D-RSRP value that is greater than X but less than 2*X, and a third value 674 represents index 14 and corresponds to a D-RSRP value that is greater than 14*X but less than 15*X. A fourth value 676 represents index 15 and corresponds to beam failure. In other words, index 15 is the predetermined value.

Once again, although the discussion focusses on RSRP as the beam quality information conveyed in the beam quality fields, the example embodiments presented herein are operable with other types of beam quality information, such as RSRQ, SNR, SINR, RSSI, and so on. Therefore the discussion of RSRP should not be construed as being limiting to either the scope or the spirit of the example embodiments.

FIG. 7 illustrates an example format of a beam information report 700 reporting partial beam failure. Beam information report 700 reports beam information for the following situation: number of beams per beam information report N=3, number of regular beams K=2, and number of failed beams M=1. Example beam indices and measured RSRP for each beam is:
 BI_first beam=5; RSRP_first beam=−90.5 dBm {regular beam},
 BI_second beam=3; RSRP_second beam=−100.5 dBm {regular beam}, and
 BI_third beam=2; RSRP_third beam=−120 dBm {failed beam}.

As shown in FIG. 7, beam information report 700 comprises:
 BI_0 field 705=5; and R-RSRP field 710=49, which corresponds to RSRP between −91 dBm and −90 dBm.
 BI_1 field 715=3; and D-RSRP_1 field 720=J, which corresponds to J*X<=10 and (J+1)*X>10, where J is a step size multiple.
 BI_2 field 725=2; and D-RSRP_2 field 730=15, which conveys beam failure.

According to an example embodiment, in a full beam failure situation, the beam information report conveys a total beam failure and conveys at least one candidate beam for beam failure recovery. In a first embodiment, a first BI field conveys a beam index of a candidate beam, a first beam quality (e.g., R-RSRP) field conveys a beam quality of the candidate beam, and a second beam quality (e.g., D-RSRP) field is set to a predetermined value to convey a total beam failure. In a second embodiment, a first BI field and a second BI field represent a beam index of a candidate beam (where the first BI field and the second BI field convey the identical value), a first beam quality (e.g., R-RSRP) field conveys a beam quality of the candidate beam, and a second beam quality (e.g., D-RSRP) field is set to a predetermined value to convey a total beam failure. As an example, the predetermined value to convey a full beam failure and the predetermined value to convey a failed beam are the same. It is noted that the predetermined value to convey full beam failure may be set to the highest value that the D-RSRP field is capable of representing. As an example, if the D-RSRP field is 4-bits long, then the predetermined value to convey full beam failure is 15 ($2^4-1$). It is noted that the predetermined value may be set to the smallest value that the D-RSRP field is capable of representing.

FIG. 8A illustrates a first example format of a beam information report 800 reporting full beam failure. Beam information report 800 is in accordance with the first embodiment of the example embodiment for reporting full beam failure. Beam information report 800 reports beam information for the following situation: number of beams per beam information report N=2, and full beam failure has occurred. The UE has identified a candidate beam with a new beam index (NBI)=5 and a measured RSRP of the candidate beam=−90.5 dBm.

As shown in FIG. 8A, beam information report 800 comprises:
 BI_0 field 805=5; and R-RSRP field 810=49, which corresponds to RSRP between −91 dBm and −90 dBm.
 BI_1 field 815=don't care (DC); and D-RSRP_1 field 820=15, which conveys full beam failure.

FIG. 8B illustrates a second example format of a beam information report 850 reporting full beam failure. Beam information report 850 is in accordance with the second embodiment of the example embodiment for reporting full beam failure. Beam information report 850 reports beam information for the following situation: number of beams per beam information report N=2, and full beam failure has occurred. The UE has identified a candidate beam with a NBI=5 and a measured RSRP of the candidate beam=−90.5 dBm.

As shown in FIG. 8B, beam information report 850 comprises:
 BI_0 field 855=5; and R-RSRP field 860=49, which corresponds to RSRP between −91 dBm and −90 dBm.
 BI_1 field 865=5; and D-RSRP_1 field 870=15, which conveys full beam failure by repeating the beam index of the candidate beam.

According to an example embodiment, in a situation where a UE has fewer beams to report than a configured number of beams to report in a single beam information report, the beam information report includes a repeated beam index field and an associated beam quality (e.g., D-RSRP) field is set to a predetermined value to convey that there are no additional beams to report. As an illustrative example, consider a situation where an access node configures a UE to report N beams per beam information report, but the UE only has K beams to report (K<N) in a particular beam information report. An example beam information report may include:
 K BI fields representing beam indices of regular beams or failed beams.
 A R-RSRP field representing a beam quality of one regular beam, e.g., a regular beam with the strongest RSRP measurement.
 K−1 D-RSRP fields representing beam qualities of remaining K−1 beams referenced to the regular beam conveyed in the R-RSRP field.
 A (K+1)-th BI field that duplicates one of the K BI fields, and a D-RSRP field associated with the (K+1)-th BI field set to either i) the predetermined value to convey that there are no additional beams to report or ii) the same value as the beam quality field associated with the one of the K BI fields duplicated in the (K+1)-th BI field.

It is noted that the predetermined value to convey that there are no additional beams to report may be zero (0). It is noted that the predetermined value to convey that there are no additional beams to report may be the same as the value representing the beam quality of the beam with the replicated beam index. It is noted that the (K+1)-th BI may duplicate the beam index of the beam with the best beam quality and the D-RSRP field associated with the (K+1)-th BI field is set to zero. It is noted that the (K+1)-th BI may duplicate the beam index of any one of K beams (i.e., duplicate any one of the K BI fields) and the D-RSRP field associated with the (K+1)-th BI field is set to zero. It is noted that the (K+1)-th BI field may duplicate the beam index of j-th beam ($2 \leq j \leq K$) and the D-RSRP field associated with the (K+1)-th BI field may also duplicate the D-RSRP field associated with the j-th BI field. It is noted that the (K+1)-th BI field may duplicate the K-th BI field, the D-RSRP field associated with the (K+1)-th BI field may also duplicate the D-RSRP field of the K-th BI field. Hence, the K-th beam and the (K+1)-th beam have the same beam index and the same beam quality, thereby conveying that there are no more beams. It is noted that the predetermined value to convey full beam failure or beam failure may be set to the highest value that the D-RSRP field is capable of representing. As an example, if the D-RSRP field is 4-bits long, then the predetermined value to convey full beam failure or beam failure is 15 ($2^4-1$).

FIG. 9 illustrates an example format of a beam information report 900 reporting fewer beams than configured. Beam information report 900 reports beam information for the following situation: number of beams per beam information report N=3, and number of beams to report K=2. Example beam indices and measured RSRP for each beam is:

BI_first beam=5; RSRP_first beamm=−90.5 dBm, and
BI_second beam=3; RSRP_second beam=−100.5 dBm.

As shown in FIG. 9, beam information report 900 comprises:

BI_0 field 905=5; and R-RSRP field 910=49, which corresponds to RSRP between −91 dBm and −90 dBm.
BI_1 field 915=3; and D-RSRP_1 field 920=J, which corresponds to J*X<=10 and (J+1)*X>10, where J is a step size multiple.
BI_2 field 925=3; and D-RSRP_2 field 930=J, the combination of the repetition of the beam index of the beam conveyed in BI_1 field 915 and D-RSRP_2 field 930 set to J conveys that there are no additional beams to report and that the beams (beam of BI_1 field 915 and BI_2 field 925) have the same beam quality.

According to an example embodiment, in a situation that is a combination of a partial beam failure and no additional beams to report, the beam information report conveys the regular beams and the failed beams, as well as one repeated beam index of any of the beams and an associated D-RSRP value set to a predetermined value to convey no additional beams to report. As an illustrative example, consider a situation where there are K regular beams and M failed beams, where 1<=K<N, 1<=M<N, and K+M<N, then an example beam information report may include:

K BI fields representing beam indices of regular beams.
A R-RSRP field representing a beam quality of one regular beam, e.g., a regular beam with the strongest RSRP measurement.
K−1 D-RSRP fields representing beam qualities of the K−1 regular beams referenced to the regular beam conveyed in the R-RSRP field.
M BI fields representing beam indices of failed beams.
M D-RSRP fields set to a predetermined value to convey a failed beam for the M failed beams.
At least one repeated BI field that replicates any one of the K regular beams or M failed beams.
At least one D-RSRP field associated with the repeated BI field set to a predetermined value conveying no additional beams to report.

It is noted that the repeated BI field may copy the beam index of a regular beam with the lowest beam quality value to convey that there are no more beams to report. It is noted that the repeated BI field may copy the beam index of a failed beam to convey that there are no more beams to report. In is noted that the predetermined value to convey that there are no additional beams to report may be the same as the value representing the beam quality of the beam with the replicated beam index. It is noted that the (K+M+1)-th BI may duplicate the beam index of the beam with the best beam quality and the D-RSRP field associated with the (K+M+1)-th BI field is set to zero. It is noted that the (K+M+1)-th BI may duplicate the beam index of any one of K beams (i.e., duplicate any one of the K BI fields) and the D-RSRP field associated with the (K+M+1)-th BI field is set to zero. It is noted that the (K+M+1)-th BI field may duplicate the beam index of j-th beam ($2 \leq j \leq K$) and the D-RSRP field associated with the (K+M+1)-th BI field may also duplicate the D-RSRP field associated with the j-th BI field. It is noted that the (K+M+1)-th BI field may duplicate the K-th BI field, then the D-RSRP field associated with the (K+M+1)-th BI field may also duplicate the D-RSRP field of the K-th BI field. It is noted that (K+1)-th BI field duplicates the beam index of the failed beam and the D-RSRP field associated with the (K+1)-th BI field is set to the predetermined value that conveys beam failure. It is noted that the (K+M+1)-th BI may duplicate the (K+M)-th BI field, the D-RSRP field associated with the (K+M+1)-th BI field may also duplicate the D-RSRP field of the (K+M)-th BI field. It is noted that the (K+M+1)-th BI field may duplicate the beam index of j-th beam ($K+1 \leq j \leq K+M$) and the D-RSRP field associated with the (K+M+1)-th BI field may set to a predetermined value that conveys a beam failure. It is noted that the predetermined value to convey full beam failure or beam failure may be set to the highest value that the D-RSRP field is capable of representing. As an example, if the D-RSRP field is 4-bits long, then the predetermined value to convey full beam failure or beam failure is 15 ($2^4-1$).

FIG. 10 illustrates an example format of a beam information report 1000 reporting partial beam failure and fewer beams than configured. Beam information report 1000 reports beam information for the following situation: number of beams per beam information report N=3, number of regular beams K=1, and number of failed beams M=1. Example beam indices and measured RSRP for each beam is:

BI_first beam=5; RSRP_first beamm=−90.5 dBm {regular beam}, and
BI_second beam=3; RSRP_second beam=−100.5 dBm {failed beam}.

As shown in FIG. 10, beam information report 1000 comprises:

BI_0 field 1005=5; and R-RSRP field 1010=49, which corresponds to RSRP between −91 dBm and −90 dBm.

BI_1 field 1015=3; and D-RSRP_1 field 1020=15, which conveys a failed beam.

BL_2 field 1025=3; and D-RSRP_2 field 1030=0, the combination of the repetition of the beam index of the beam conveyed in BI_1 field 1015 and D-RSRP_2 field 1030 set to 0 conveys that there are no additional beams to report.

It is noted that FIG. 10 illustrates a single example format of a beam information report. Other example formats of a beam information reports are possible for this scenario. As a first illustrative example, BI_0 field 1005=5; and R-RSRP field 1010=49, which corresponds to RSRP between −91 dBm and −90 dBm.

BI_1 field 1015=3; and D-RSRP_1 field 1020=15, which conveys a failed beam.

BL_2 field 1025=5; and D-RSRP_2 field 1030=0, the combination of the repetition of the beam index of the beam conveyed in BI_0 field 1005 and D-RSRP_2 field 1030 set to 0 conveys that there are no additional beams to report.

As a second illustrative example,

BI_0 field 1005=5; and R-RSRP field 1010=49, which corresponds to RSRP between −91 dBm and −90 dBm.

BI_1 field 1015=3; and D-RSRP_1 field 1020=15, which conveys a failed beam.

BL_2 field 1025=3; and D-RSRP_2 field 1030=15, the combination of the repetition of the beam index of the beam conveyed in BI_1 field 1015 and D-RSRP_2 field 1030 set to 15 conveys that there are no additional beams to report.

FIG. 11 illustrates a flow diagram of example operations 1100 occurring in a UE generating and sending a beam information report. Operations 1100 may be indicative of operations occurring in a UE as the UE generates and sends a beam information report. The beam information report may be sent in a frame or a message.

Operations 1100 begin with the UE receiving beam information report configuration from an access node (block 1105). The beam information report configuration may specify a number of beams to report per beam information report, which resources the UE is to use to send the beam information report, which resources the UE is to use to make channel measurements, beam quality (e.g., R-RSRP) index to measured beam quality (e.g., RSRP) value mappings, beam quality (e.g., D-RSRP) index to differential measured beam quality (e.g., RSRP) value versus reference beam quality (e.g., RSRP) value, and so on. The UE performs a check to determine if a partial beam failure has occurred with the beams that it is reporting in a beam information report (block 1107). If a partial beam failure has occurred, the UE generates a beam information report that includes at least one beam index of a failed beam and a corresponding D-RSRP value conveying a beam failure (block 1109). The UE sends the beam information report (block 1125).

If a partial beam failure has not occurred, the UE performs a check to determine if a full beam failure has occurred (block 1111). If a full beam failure has occurred, the UE generates a beam information report with information of a candidate beam (e.g., beam index and measured RSRP value) as well as a D-RSRP value conveying a full beam failure (block 1113). The D-RSRP value may be associated with a beam index set to either a beam index of the candidate beam or the beam index is a don't care value. The UE sends the beam information report (block 1125).

If a full beam failure has not occurred, the UE performs a check to determine if the UE is reporting beam information for fewer beams than configured by the access node (block 1115). In other words, the UE checks to determine if it is reporting beam information for K beams, where K is less than N, the configured number of beams to report. If the UE is reporting fewer beams than the configured number of beams, the UE generates a beam information report with beam information for the K beams and adds an addition beam index field that replicates the beam index of any one of the K beams with beam information and an associated D-RSRP field set to a predetermined value that conveys that no additional beams are reported (block 1117). The UE sends the beam information report (block 1125).

If the UE is reporting beam information for the configured number of beams, the UE performs a check to determine if a partial beam failure has occurred and if the UE is reporting beam information for fewer beams than configured by the access node (block 1119). If a partial beam failure has occurred and if the UE is reporting fewer beams than the configured number of beams, the UE generates a beam information report including includes at least one beam index of a failed beam and a corresponding D-RSRP value conveying a beam failure and an additional beam index field with a beam index that replicates a beam index already reported in the beam information report and a corresponding D-RSRP value conveying that no additional beams are reported (block 1121). The UE sends the beam information report (block 1125).

If the UE is not reporting a partial beam failure and not reporting beam information for fewer beams than configured, the UE generates a beam information report for the configured number of beams (block 1123). The UE sends the beam information report (block 1125).

Blocks 1107, 1111, 1115, and 1119 may be considered to be collectively as determining a type of beam information to be included in a beam information report.

Figure 12:
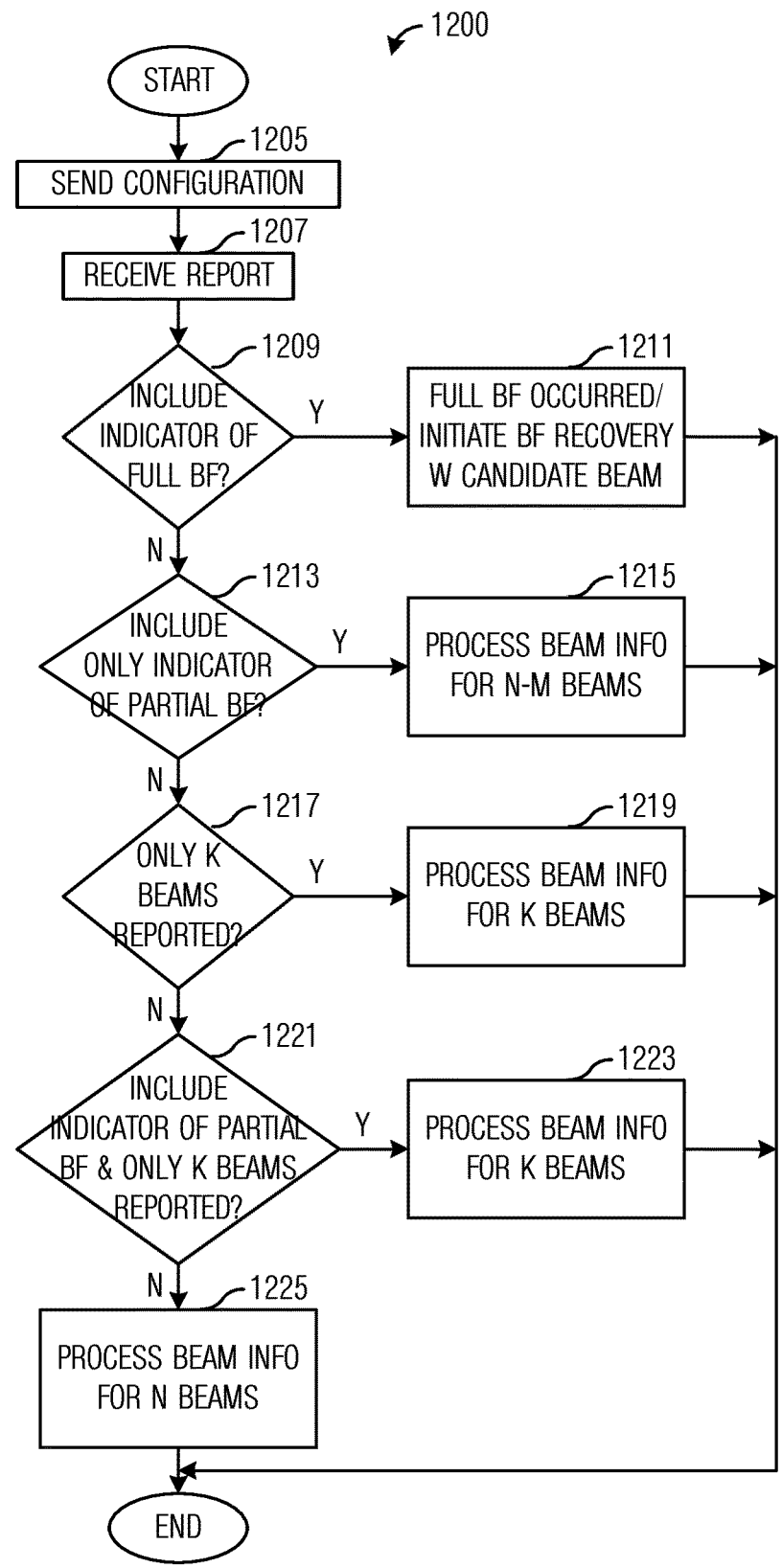
FIG. 12 illustrates a flow diagram of example operations in an access node receiving and processing beam report information according to example embodiments described herein.

FIG. 12 illustrates a flow diagram of example operations 1200 in an access node receiving and processing beam report information. Operations 1200 may be indicative of operations occurring in an access node as the access node receives and processes beam report information.

Operations 1200 begin with the access node sending beam information report configuration to a UE (block 1205). The beam information report configuration may specify a number of beams to report per beam information report, which resources the UE is to use to send the beam information report, which resources the UE is to use to make channel measurements, which resources the UE is to use to detect beam failure, R-RSRP index to measured RSRP value mappings, D-RSRP index to differential measured RSRP value versus reference RSRP value, and so on. The access node receives a beam information report (block 1207).

The access node performs a check to determine if the beam information report includes information conveying a full beam failure (block 1209). As an example, the access node checks to determine if the beam information report includes information conveying a full beam failure by examining a beam information report type of the beam information report. The beam information report type is a field of the third field type of the beam information report, as described previously. If the beam information report includes information conveying a full beam failure, the access node determines that the UE has experienced a full beam failure and initiates beam failure recovery with a candidate beam that is conveyed in the beam information report (block 1211).

If the beam information report does not include information conveying a full beam failure, the access node performs a check to determine if the beam information report includes only information conveying a partial beam failure (block 1213). As an example, the access node checks to determine if the beam information report includes information conveying a partial beam failure by examining a beam information report type of the beam information report. The check may determine if the beam information report includes only the information conveying a partial beam failure and not any other special information, the check may not determine if the beam information report includes beam indices of beams and RSRP values associated with the beams. If the beam information report includes information conveying a partial beam failure, the access node processes beam information for the beams that did not experience beam failure (block 1215). If N is the configured number of beams for the beam information report and M is the number of failed beams, the access node may process beam information for N-M beams.

If the beam information report does not include only information conveying a partial beam failure, the access node performs a check to determine if the beam information report includes information conveying that the UE is reporting beam information for fewer beams than configured by the access node (block 1217). As an example, the access node checks to determine if the beam information report includes information conveying beam information for fewer beams than configured by the access node by examining a beam information report type of the beam information report. If the UE is reporting beam information for fewer beams than configured by the access node, the access node processes beam information for the beams reported by the UE (block 1219). If K is the number of beams with reported beam information in the beam information report, the access node may process information for K beams.

If the UE is not reporting beam information for fewer beams than configured by the access node, the access node performs a check to determine if the beam information report includes information conveying a partial beam failure and information conveying that the UE is reporting beam information for fewer beams than configured by the access node (block 1221). As an example, the access node checks to determine if the beam information report includes information conveying a partial beam failure and information conveying that the UE is reporting beam information for fewer beams than configured by the access node by examining a beam information report type of the beam information report. If the beam information report includes information conveying a partial beam failure and information conveying that the UE is reporting beam information for fewer beams than configured by the access node, the access node processes information for the beam information for the beams reported by the UE (block 1223). If K is the number of beams with reported beam information in the beam information report, the access node may process information for K beams.

If the beam information report does not include information conveying a partial beam failure nor information conveying that the UE is reporting beam information for fewer beams than configured by the access node, the access node processes beam information for the beams reported by the UE (block 1225). If N is the configured number of beams for the beam information report, the access node may process information for N beams.

It is noted that FIGS. 11 & 12, along with associated discussion, present a situation where partial beam failure, full beam failure, and no additional beams to report are all potentially occurring events. However, the flow diagrams shown in FIGS. 11 & 12 may be readily modified to support situations where not all three events can occur. Therefore, the discussion of all three events potentially occurring in a scenario should not be construed as being limiting to either the scope or the spirit of the example embodiments. As an illustrative example, if the beam information report does not support the reporting of fewer beams than the configured number, blocks 1115, 1117, 1119, and 1121 of FIG. 11 and blocks 1217, 1219, 1221, and 1223 of FIG. 12 may be eliminated.

Figure 13:
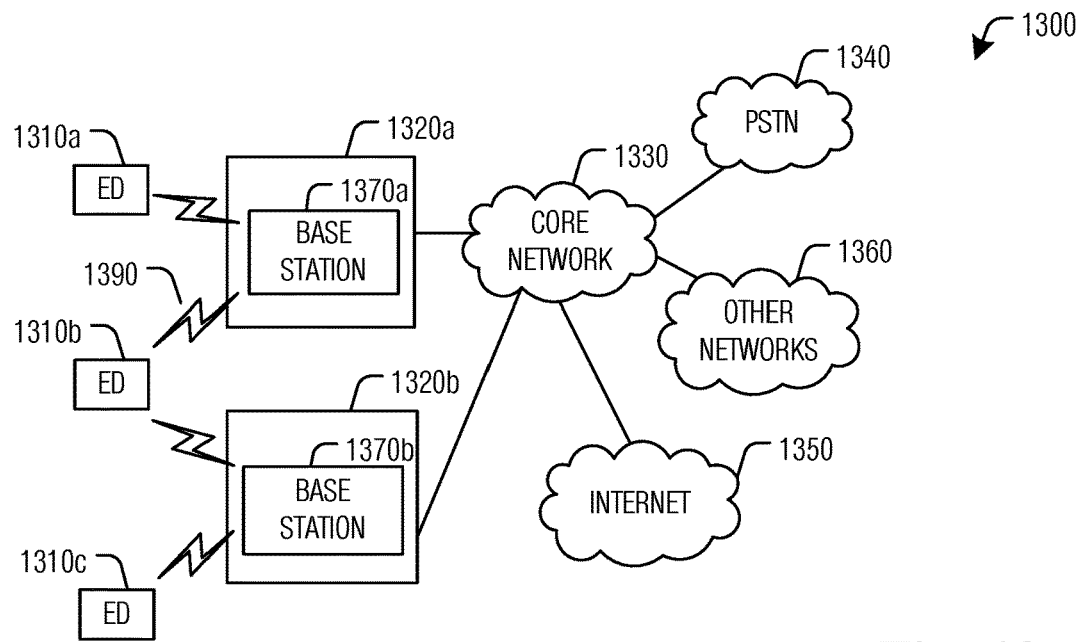
FIG. 13 illustrates an example communication system according to example embodiments described herein.

FIG. 13 illustrates an example communication system 1300. In general, the system 1300 enables multiple wireless or wired users to transmit and receive data and other content. The system 1300 may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NOMA).

In this example, the communication system 1300 includes electronic devices (ED) 1310a-1310c, radio access networks (RANs) 1320a-1320b, a core network 1330, a public switched telephone network (PSTN) 1340, the Internet 1350, and other networks 1360. While certain numbers of these components or elements are shown in FIG. 13, any number of these components or elements may be included in the system 1300.

The EDs 1310a-1310c are configured to operate or communicate in the system 1300. For example, the EDs 1310a-1310c are configured to transmit or receive via wireless or wired communication channels. Each ED 1310a-1310c represents any suitable end user device and may include such devices (or may be referred to) as a user equipment or device (UE), wireless transmit or receive unit (WTRU), mobile station, fixed or mobile subscriber unit, cellular telephone, personal digital assistant (PDA), smartphone, laptop, computer, touchpad, wireless sensor, or consumer electronics device.

The RANs 1320a-1320b here include base stations 1370a-1370b, respectively. Each base station 1370a-1370b is configured to wirelessly interface with one or more of the EDs 1310a-1310c to enable access to the core network 1330, the PSTN 1340, the Internet 1350, or the other networks 1360. For example, the base stations 1370a-1370b may include (or be) one or more of several well-known devices, such as a base transceiver station (BTS), a Node-B (NodeB), an evolved NodeB (eNodeB), a Home NodeB, a Home eNodeB, a site controller, an access point (AP), or a wireless router. The EDs 1310a-1310c are configured to interface and communicate with the Internet 1350 and may access the core network 1330, the PSTN 1340, or the other networks 1360.

In the embodiment shown in FIG. 13, the base station 1370a forms part of the RAN 1320a, which may include other base stations, elements, or devices. Also, the base station 1370b forms part of the RAN 1320b, which may include other base stations, elements, or devices. Each base station 1370a-1370b operates to transmit or receive wireless signals within a particular geographic region or area, sometimes referred to as a "cell." In some embodiments, multiple-input multiple-output (MIMO) technology may be employed having multiple transceivers for each cell.

The base stations 1370a-1370b communicate with one or more of the EDs 1310a-1310c over one or more air interfaces 1390 using wireless communication links. The air interfaces 1390 may utilize any suitable radio access technology.

It is contemplated that the system 1300 may use multiple channel access functionality, including such schemes as described above. In particular embodiments, the base stations and EDs implement LTE, LTE-A, or LTE-B. Of course, other multiple access schemes and wireless protocols may be utilized.

The RANs 1320a-1320b are in communication with the core network 1330 to provide the EDs 1310a-1310c with voice, data, application, Voice over Internet Protocol (VoIP), or other services. Understandably, the RANs 1320a-1320b or the core network 1330 may be in direct or indirect communication with one or more other RANs (not shown). The core network 1330 may also serve as a gateway access for other networks (such as the PSTN 1340, the Internet 1350, and the other networks 1360). In addition, some or all of the EDs 1310a-1310c may include functionality for communicating with different wireless networks over different wireless links using different wireless technologies or protocols. Instead of wireless communication (or in addition thereto), the EDs may communicate via wired communication channels to a service provider or switch (not shown), and to the Internet 1350.

Although FIG. 13 illustrates one example of a communication system, various changes may be made to FIG. 13. For example, the communication system 1300 could include any number of EDs, base stations, networks, or other components in any suitable configuration.

Figure 14A:
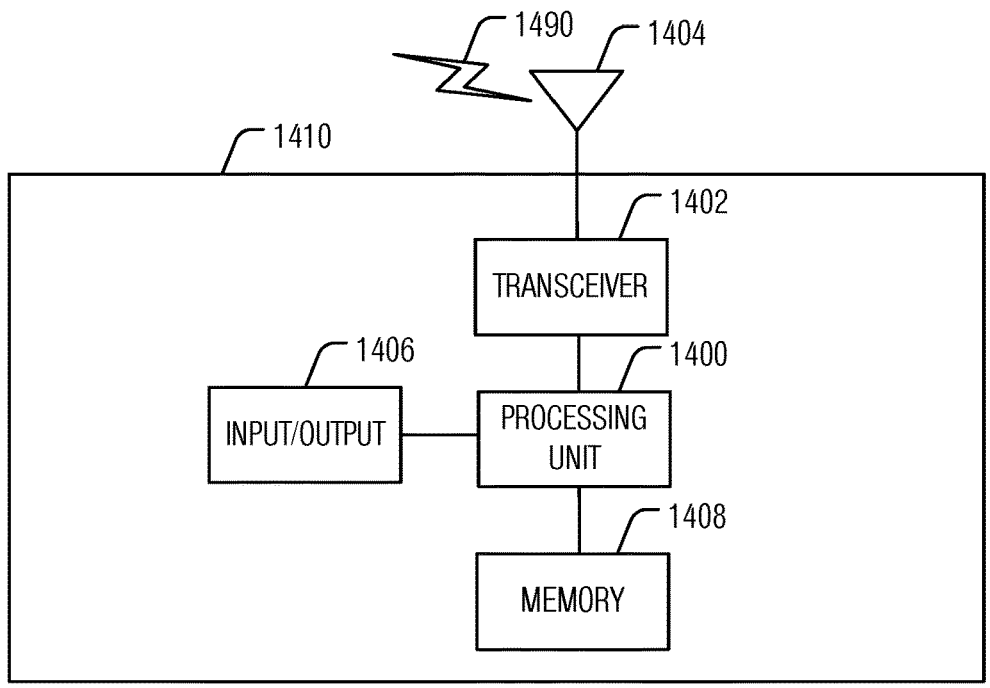
FIGS. 14A and 14B illustrate example devices that may implement the methods and teachings according to this disclosure.
Figure 14B:
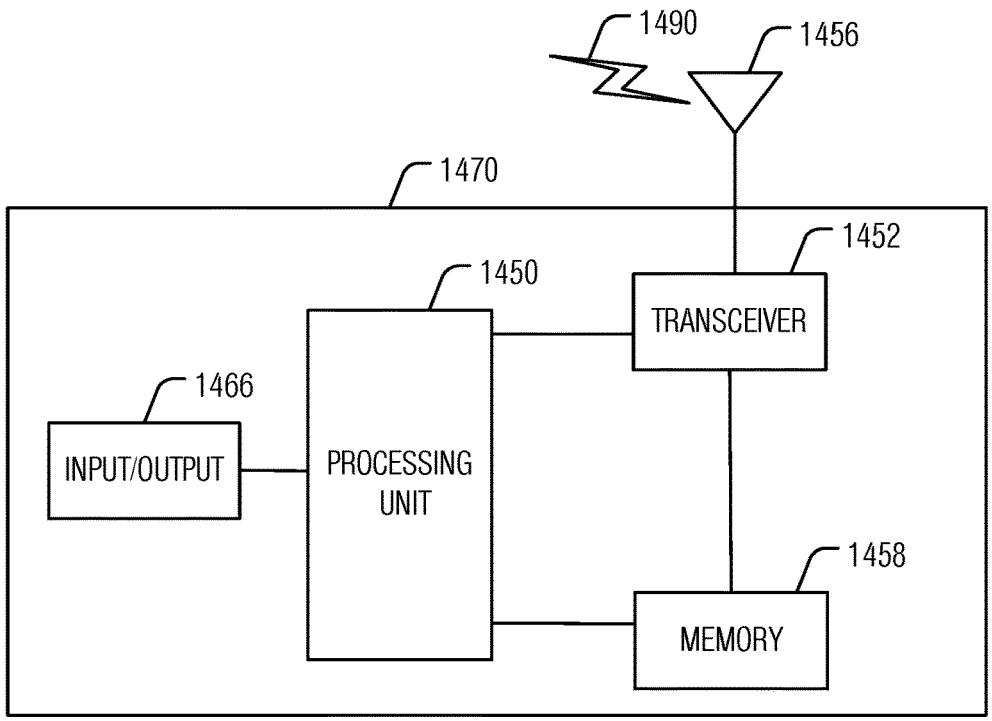

FIGS. 14A and 14B illustrate example devices that may implement the methods and teachings according to this disclosure. In particular, FIG. 14A illustrates an example ED 1410, and FIG. 14B illustrates an example base station 1470. These components could be used in the system 1300 or in any other suitable system.

As shown in FIG. 14A, the ED 1410 includes at least one processing unit 1400. The processing unit 1400 implements various processing operations of the ED 1410. For example, the processing unit 1400 could perform signal coding, data processing, power control, input or output processing, or any other functionality enabling the ED 1410 to operate in the system 1300. The processing unit 1400 also supports the methods and teachings described in more detail above. Each processing unit 1400 includes any suitable processing or computing device configured to perform one or more operations. Each processing unit 1400 could, for example, include a microprocessor, microcontroller, digital signal processor, field programmable gate array, or application specific integrated circuit.

The ED 1410 also includes at least one transceiver 1402. The transceiver 1402 is configured to modulate data or other content for transmission by at least one antenna or NIC (Network Interface Controller) 1404. The transceiver 1402 is also configured to demodulate data or other content received by the at least one antenna 1404. Each transceiver 1402 includes any suitable structure for generating signals for wireless or wired transmission or processing signals received wirelessly or by wire. Each antenna 1404 includes any suitable structure for transmitting or receiving wireless or wired signals. One or multiple transceivers 1402 could be used in the ED 1410, and one or multiple antennas 1404 could be used in the ED 1410. Although shown as a single functional unit, a transceiver 1402 could also be implemented using at least one transmitter and at least one separate receiver.

The ED 1410 further includes one or more input or output devices 1406 or interfaces (such as a wired interface to the Internet 1350). The input or output devices 1406 facilitate interaction with a user or other devices (network communications) in the network. Each input or output device 1406 includes any suitable structure for providing information to or receiving or providing information from a user, such as a speaker, microphone, keypad, keyboard, display, or touch screen, including network interface communications.

In addition, the ED 1410 includes at least one memory 1408. The memory 1408 stores instructions and data used, generated, or collected by the ED 1410. For example, the memory 1408 could store software or firmware instructions executed by the processing unit(s) 1400 and data used to reduce or eliminate interference in incoming signals. Each memory 1408 includes any suitable volatile or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 14B, the base station 1470 includes at least one processing unit 1450, at least one transceiver 1452, which includes functionality for a transmitter and a receiver, one or more antennas 1456, at least one memory 1458, and one or more input or output devices or interfaces 1466. A scheduler, which would be understood by one skilled in the art, is coupled to the processing unit 1450. The scheduler could be included within or operated separately from the base station 1470. The processing unit 1450 implements various processing operations of the base station 1470, such as signal coding, data processing, power control, input or output processing, or any other functionality. The processing unit 1450 can also support the methods and teachings described in more detail above. Each processing unit 1450 includes any suitable processing or computing device configured to perform one or more operations. Each processing unit 1450 could, for example, include a microprocessor, microcontroller, digital signal processor, field programmable gate array, or application specific integrated circuit.

Each transceiver 1452 includes any suitable structure for generating signals for wireless or wired transmission to one or more EDs or other devices. Each transceiver 1452 further includes any suitable structure for processing signals received wirelessly or by wire from one or more EDs or other devices. Although shown combined as a transceiver 1452, a transmitter and a receiver could be separate components. Each antenna 1456 includes any suitable structure for transmitting or receiving wireless or wired signals. While a common antenna 1456 is shown here as being coupled to the transceiver 1452, one or more antennas 1456 could be coupled to the transceiver(s) 1452, allowing separate antennas 1456 to be coupled to the transmitter and the receiver if equipped as separate components. Each memory 1458 includes any suitable volatile or non-volatile storage and retrieval device(s). Each input or output device 1466 facilitates interaction with a user or other devices (network communications) in the network. Each input or output device 1466 includes any suitable structure for providing information to or receiving or providing information from a user, including network interface communications.

Figure 15:
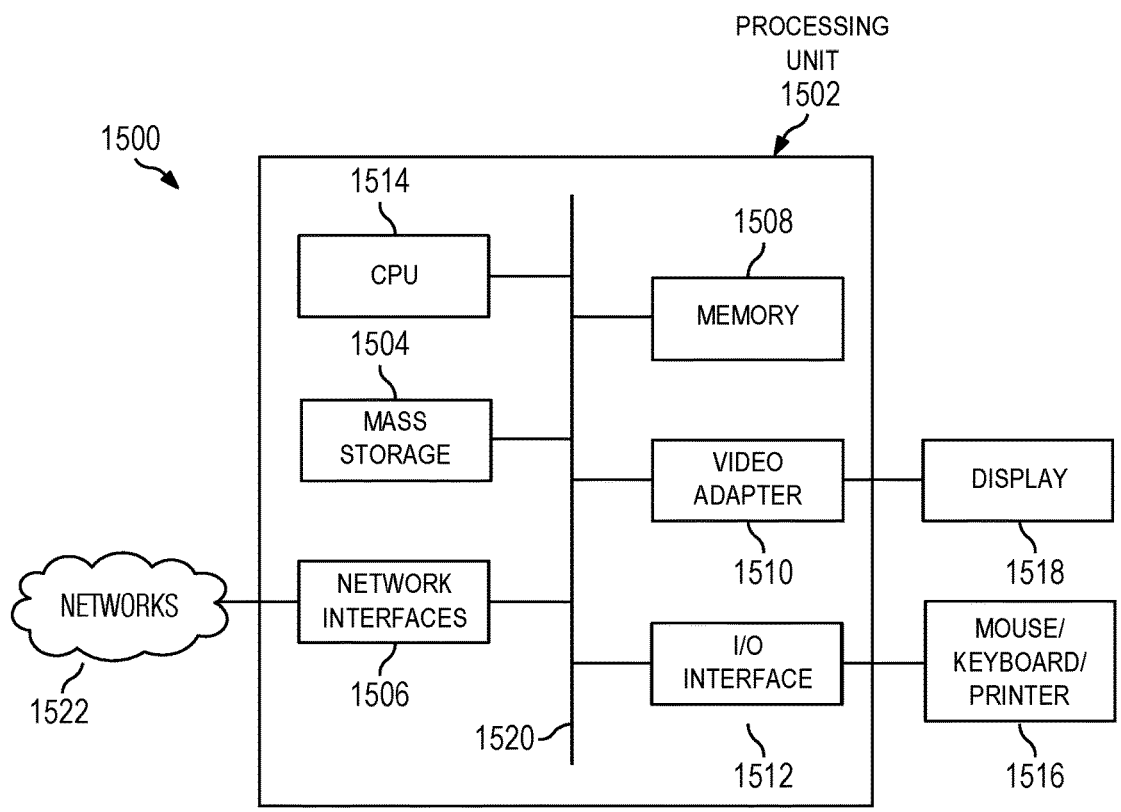
FIG. 15 is a block diagram of a computing system that may be used for implementing the devices and methods disclosed herein.

FIG. 15 is a block diagram of a computing system 1500 that may be used for implementing the devices and methods disclosed herein. For example, the computing system can be any entity of UE, access network (AN), mobility management (MM), session management (SM), user plane gateway (UPGW), or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1500 includes a processing unit 1502. The processing unit includes a central processing unit (CPU)

1514, memory 1508, and may further include a mass storage device 1504, a video adapter 1510, and an I/O interface 1512 connected to a bus 1520.

The bus 1520 may be one or more of any type of several bus architectures including a memory bus or memory controller, a peripheral bus, or a video bus. The CPU 1514 may comprise any type of electronic data processor. The memory 1508 may comprise any type of non-transitory system memory such as static random access memory (SRAM), dynamic random access memory (DRAM), synchronous DRAM (SDRAM), read-only memory (ROM), or a combination thereof. In an embodiment, the memory 1508 may include ROM for use at boot-up, and DRAM for program and data storage for use while executing programs.

The mass storage 1504 may comprise any type of non-transitory storage device configured to store data, programs, and other information and to make the data, programs, and other information accessible via the bus 1520. The mass storage 1504 may comprise, for example, one or more of a solid state drive, hard disk drive, a magnetic disk drive, or an optical disk drive.

The video adapter 1510 and the I/O interface 1512 provide interfaces to couple external input and output devices to the processing unit 1502. As illustrated, examples of input and output devices include a display 1518 coupled to the video adapter 1510 and a mouse, keyboard, or printer 1516 coupled to the I/O interface 1512. Other devices may be coupled to the processing unit 1502, and additional or fewer interface cards may be utilized. For example, a serial interface such as Universal Serial Bus (USB) (not shown) may be used to provide an interface for an external device.

The processing unit 1502 also includes one or more network interfaces 1506, which may comprise wired links, such as an Ethernet cable, or wireless links to access nodes or different networks. The network interfaces 1506 allow the processing unit 1502 to communicate with remote units via the networks. For example, the network interfaces 1506 may provide wireless communication via one or more transmitters or transmit antennas and one or more receivers or receive antennas. In an embodiment, the processing unit 1502 is coupled to a local-area network 1522 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a determining unit or module, a setting unit or module, or a processing unit or module. The respective units or modules may be hardware, software, or a combination thereof. For instance, one or more of the units or modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

What is claimed is:

1. A computer implemented method for reporting beam information, the method comprising:

receiving, by a user equipment (UE), a plurality of reference signals from a plurality of access nodes;

identifying, by the UE, failed communication beam(s) based on beam qualities of communication beam(s) used to communicate the plurality of reference signals; and transmitting, by the UE, a beam failure report to one access node of the plurality of access nodes, the beam failure report specifying identifier(s) associated with the failed communication beam(s), the beam failure report including a separate indication of beam failure associated with each access node.

2. The method of claim 1, wherein the beam failure report is a complete beam failure report that identifies all of the communication beam(s) used to communicate the plurality of reference signals as the failed communication beam(s).

3. The method of claim 1, wherein the beam failure report is a partial beam failure report that identifies a subset of the communication beam(s) used to communicate the plurality of reference signals as the failed communication beam(s).

4. The method of claim 3, wherein the subset of the communication beam(s) excludes at least one of the communication beam(s) used to communicate the plurality of reference signals.

5. The method of claim 4, wherein the at least one of the communication beam(s) excluded from the subset of the communication beam(s) has a higher beam quality than any communication beam in the subset of the communication beam(s).

6. The method of claim 1, the communication beam(s) including a plurality of communication beams, the receiving the plurality of reference signals comprising:

receiving, by the UE, the plurality of reference signals from the plurality of access nodes, wherein the beam failure report identifies a status of the plurality of communication beams.

7. The method of claim 1, the beam failure report further indicating cell(s) associated with the failed communication beam(s).

8. The method of claim 1, the beam failure report specifying identifier(s) identifying the failed communication beam(s).

9. A user equipment (UE) comprising:

a memory storage comprising instructions; and one or more processors in communication with the memory storage, wherein the one or more processors execute the instructions to:

receive a plurality of reference signals from a plurality of access nodes;

identify failed communication beam(s) based on beam qualities of communication beam(s) used to communicate the reference signals; and transmit a beam failure report to one access node of the plurality of access nodes, the beam failure report specifying identifier(s) associated with the failed communication beam(s), the beam failure report including a separate indication of beam failure associated with each access node.

10. The UE of claim 9, wherein the beam failure report is a complete beam failure report that identifies all of the communication beam(s) used to communicate the plurality of reference signals as the failed communication beam(s).

11. The UE of claim 9, wherein the beam failure report is a partial beam failure report that identifies a subset of the communication beam(s) used to communicate the plurality of reference signals as the failed communication beam(s).

12. The UE of claim 11, wherein the subset of the communication beam(s) identified as the failed communication beam(s) by the beam failure report excludes at least one of the communication beam(s) used to communicate the plurality of reference signals.

13. The UE of claim 12, wherein the at least one of the communication beam(s) excluded from the subset of the communication beam(s) has a higher beam quality than any communication beam in the subset of the communication beam(s).

14. The UE of claim 9, the communication beam(s) including a plurality of communication beams, the one or more processors execute the instructions to receive the plurality of reference signals by:

receiving the plurality of reference signals from the plurality of access nodes, wherein the beam failure report identifies a status of the plurality of communication beams.

15. A non-transitory computer readable storage medium having instructions stored thereon that, when executed by a user equipment (UE), cause the UE to perform operations, the operations comprising:

receiving a plurality of reference signals from a plurality of access nodes;

identifying failed communication beam(s) based on beam qualities of communication beam(s) used to communicate the plurality of reference signals; and transmitting a beam failure report to one access node of the plurality of access nodes, the beam failure report specifying identifier(s) associated with the failed communication beam(s), the beam failure report including a separate indication of beam failure associated with each access node.

16. The non-transitory computer readable storage medium of claim 15, wherein the beam failure report is a complete beam failure report that identifies all of the communication beam(s) used to communicate the plurality of reference signals as the failed communication beam(s).

17. The non-transitory computer readable storage medium of claim 15, wherein the beam failure report is a partial beam failure report that identifies a subset of the communication beam(s) used to communicate the plurality of reference signals as the failed communication beam(s).

18. The non-transitory computer readable storage medium of claim 17, wherein the subset of the communication beam(s) identified as the failed communication beam(s) by the beam failure report excludes at least one of the communication beam(s) used to communicate the plurality of reference signals.

19. The non-transitory computer readable storage medium of claim 18, wherein the at least one of the communication beam(s) excluded from the subset of the communication beam(s) has a higher beam quality than any communication beam in the subset of the communication beam(s).

20. The non-transitory computer readable storage medium of claim 15, the communication beam(s) including a plurality of communication beams, the receiving the plurality of reference signals comprising:

receiving the plurality of reference signals from the plurality of access nodes, wherein the beam failure report identifies a status of the plurality of communication beams.

* * * * *